United States Patent [19]

Ogusu

[11] Patent Number: 4,802,158

[45] Date of Patent: Jan. 31, 1989

[54] DISC CLAMPING DEVICE FOR A DISC CARTRIDGE PLAYER

[75] Inventor: Mikio Ogusu, Hamamatsu, Japan

[73] Assignee: Nippon Gakki Seizo Kabushiki Kaisha, Hamamatsu, Japan

[21] Appl. No.: 813,533

[22] Filed: Dec. 26, 1985

[30] Foreign Application Priority Data

Dec. 28, 1984 [JP] Japan .................. 59-198375[U]
Dec. 28, 1984 [JP] Japan .................. 59-198376[U]

[51] Int. Cl.⁴ .................................. G11B 25/04
[52] U.S. Cl. ............................ 369/270; 369/271; 369/290
[58] Field of Search ............... 369/270, 291, 271

[56] References Cited

U.S. PATENT DOCUMENTS

| | | | |
|---|---|---|---|
| 1,499,573 | 2/1925 | Mernaga | 369/270 |
| 4,351,047 | 9/1982 | Redlich et al. | 369/270 |
| 4,402,405 | 9/1983 | Fullalove | 369/291 |
| 4,477,894 | 10/1984 | Clurman | 369/291 |
| 4,498,165 | 2/1985 | Wilkinsen | 369/279 |
| 4,535,434 | 8/1985 | Kishi | 369/291 |
| 4,571,718 | 2/1986 | Cahill et al. | 369/291 |
| 4,587,647 | 5/1986 | Mak et al. | 369/270 |
| 4,669,278 | 6/1987 | Ogusu | 369/291 |

Primary Examiner—Steven L. Stephan
Attorney, Agent, or Firm—Spensley Horn Jubas & Lubitz

[57] ABSTRACT

In a disc cartridge player of a type in which a cartridge housing the disc is loaded in the player for playback of the disc, a disc clamping device for clamping the disc on a turntable of the player includes a magnetic attraction generating device which is constructed by forming at least a part of either one of a disc stabilizer provided in the disc cartridge on the turntable from a magnet and the other from a magnetic substance. The magnetic attraction generating device can also be constructed by forming at least a part of both the disc stabilizer and the turntable respectively from a magnet. The provision of the magnetic attraction generating device enables reduction of a force of a spring urging a clamper for pressing the disc stabilizer with resulting reduction of a drive force for operating the clamper in a release direction in an eject mode and, in some case, even obviates the necessity for providing the clamper itself.

15 Claims, 6 Drawing Sheets

DISC CLAMPING DEVICE FOR A DISC CARTRIDGE PLAYER

BACKGROUND OF THE INVENTION

This invention relates to a disc clamping device for clamping a disc on a turntable of a disc cartridge player in which playback of the disc is accomplished by loading a cartridge housing the disc into the player.

Known in the art of a disc playback device is a device in which playback of a disc is accomplished by loading a cartridge housing the disc into the disc playback device.

As a disc cartridge and a disc cartridge player of this type, the inventor of the present invention and others have proposed in U.S. patent applications Nos. 721,666, 773,304, 781,768 and 781,751 a disc cartridge and a disc cartridge player capable of securely clamping the disc on the turntable even in a case where the disc to be played back is one with a relatively large thickness such as a Compact Disc for the Compact Disc Digital Audio System.

FIG. 8 shows a main part of this type of disc cartridge player. In FIG. 8, reference character A designates a disc cartridge and reference character B a disc playback device.

The disc cartridge A is formed in a box-like shape and includes an upper case 1 and a lower case 2 with a disc 3 being rotatably received between these cases 1 and 2. The upper case 1 is formed in its central portion with an opening 4. A disc stabilizer 5 is disposed in the opening 4 in such a manner that it is rotatable and also is prevented from disengaging from the opening 4 in the vertical direction. The lower case 2 is formed in its central portion with a turntable opening 6. A disc drive motor 8 is fixed to the lower surface of a chassis 7 of the disc playback device B. A disc-like turntable 10 is fixed to a shaft 9 of the motor 8. A clamper 12 having a steel ball 11 secured on its lower surface is disposed above the chassis 7. The clamper 12 is always urged downwardly by a spring 13 provided between the clamper 12 and the chassis 7 and also can be lifted compulsorily against the force of the spring 13 by unillustrated drive means.

In the player described above, the operation for loading the cartridge A into the disc playback device B is performed in the following manner. In a state in which the cartridge A is loaded, the clamper 12 is in a position in which it is elevated from the chassis 7 by a predetermined distance by the unillustrated drive means against the force of the spring 13. Then the cartridge A is displaced horizontally by a loading device (not shown) and introduced into a space defined between the turntable 10 and the clamper 12. Upon reaching of the turntable insertion opening 6 of the cartridge A to a position above the turntable 10, the cartridge A and the clamper 12 are lowered with a result that the turntable 10 enters the opening 6 and comes into abutting engagement with the lower surface of the disc 3. A projecting portion 10a of the turntable 10 enters the central opening of the disc 3 at this time thereby performing a horizontal positioning of the disc 3. In the meanwhile, the steel ball 11 of the clamper 12 located above the disc stabilizer 5 pushes the stabilizer 5 downwardly by the force of the spring 13 and the disc 3 thereby is held in position between the turntable 10 and the stabilizer 5. When the disc 3 has been held in position in the above described manner, the cartridge A and the clamper 12 cease their downward movement. By starting rotation of the motor 8 in this state, the turntable 10 rotates the disc 3 and the stabilizer 5 together with the stabilizer 5 being rotatably supported by the steel ball 11. In ejecting the disc cartridge A, the unillustrated drive means is operated to lift the cartridge A and the clamper 12 and then move the cartride A horizontally in the reverse direction thereby bringing it back to its original position.

In the disc cartridge player described above, the force to hold the disc 3, i.e., the force to hold the disc 3 between the turntable 10 and the stabilizer 5, is provided by the urging force of the spring 13 provided between the clamper 12 and the chassis 7 and, in ejecting the disc 3, the clamper 12 must be lifted by the clamper drive means against the force of this spring 13. Hence this player disadvantageously requires a spring of a very strong urging force for accurately holding the disc 3 and this in turn necessitates drive means of a very strong driving force for lifting the clamper 12 in ejecting the disc 3.

It is, therefore, an object of the present invention to provide a disc clamping device for a disc cartridge player which does not require a spring of such a strong force for urging the clamper but even is capable of obviating the clamper itself if desired while ensuring accurate holding of a disc on the turntable.

SUMMARY OF THE INVENTION

For achieving the above described object of the invention, it is a feature of the present invention that magnetic attraction generating means is provided in a disc stabilizer of a disc cartridge and a turntable of a disc playback device for holding a disc therebetween.

The magnetic attraction generating means can be constructed by forming at least a part of either one of the disc stabilizer and the turntable by a magnetic and forming at least a part of the other by magnetic substance. The magnetic attraction generating means can also be constructed by forming at least a part of both the disc stabilizer and the turntable respectively by a magnet. In a preferred embodiment of the invention, a yoke is attached to the magnet for enhancing the magnetic attraction.

According to the invention, in a player of a type in which a disc stabilizer is pressed against a disc by means of a clamper urged by the force of a spring, the force of the spring can be set at a small value by virtue of the provision of the magnetic attraction generating means and the drive force for operating the clamper in the ejection mode thereby can be reduced. In a player of a type in which force required for holding the disc against the turntable is relatively small, e.g., a stationary type disc cartridge player, the necessity for providing the clamper itself can be obviated so that the construction of the player can be greatly simplified.

Since the magnetic attraction generating means is partly provided on the disc stabilizer in the disc cartridge, the disc can be held in position very easily by simply loading the disc cartridge in a space above the turntable of the disc playback device.

BRIEF DESCRIPTION OF THE DRAWINGS

In the accompanying drawings, FIGS. 1 through 7 show an embodiment of the disc clamping device according to the invention in which:

FIG. 1 is a vertical section showing a main part of a disc playback device D in which a disc cartridge C is loaded;

FIG. 2 is a perspective view of the disc cartridge C in a closed state;

FIG. 3 is a perspective view of the disc cartridge C in an open state;

FIG. 4 is an exploded perspective view of the disc cartridge C;

FIG. 5 is a plan view of the disc playback device D;

FIG. 6 is a side elevation of the disc playback device D; and

FIG. 7 is a view showing a manner of assembling a magnet assembly; and

DESCRIPTION OF PREFERRED EMBODIMENTS

Figure 1:
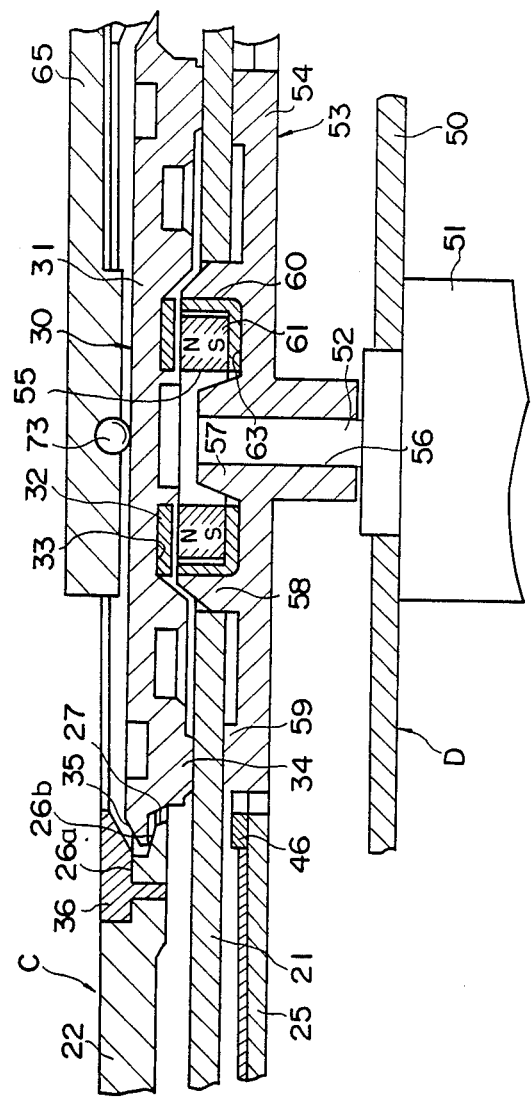
Figure 2:
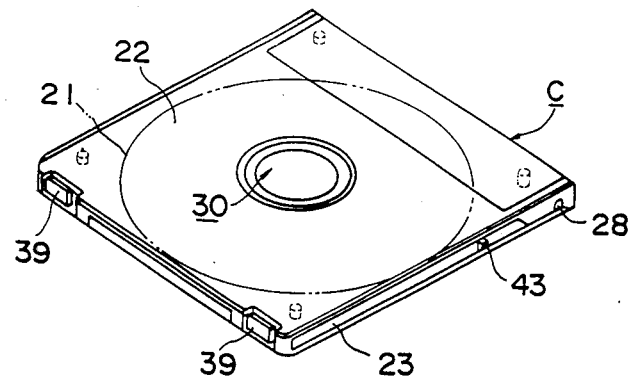

FIGS. 1 through 7 show an embodiment of the present invention applied to a Compact Disc Player for playing back a Compact Disc.

A disc cartridge player to be described below consists of a disc cartridge C and a disc playback device D and is of the type in which the disc cartridge C housing a disc (Compact Disc) therein is loaded in the disc playback device D for playback of the disc.

Referring first to FIGS. 1 through 4, the structure of the disc cartridge C will be described. As illustrated in these figures, the disc cartridge C is a plate-like case having a certain thickness and having an oblong shape as viewed in a plan. This disc cartridge C comprises, as its principal components, an upper case 22, a lower case 23, a shutter plate 24 and a plate 25.

The upper case 22 is formed in its central portion with an opening 27 having stepped portions 26a and 26b, in its rear end portion with bosses 28, 28 and in its front end portion with engaging projections 29, 29. A disc stabilizer 30 is disposed in the opening 27. This stabilizer 30 comprises a disc-like main body 31 made of synthetic resin and a magnetic substance ring 32 made of a magnetic substance of a high-permeability fixed on the lower surface of the main body 31. This ring 32 constitutes a part of magnetic attraction generating means. The main body 31 is formed in its central lower portion with an annular groove 33, in its peripheral lower portion with an annular disc holding portion 34 and on its peripheral side with a projecting portion 35. The magnetic substance ring 32 is fixed to the bottom surface of the annular groove 33 by suitable means such as bonding. By fixing a ring 36 to the stepped portion 26a of the upper case 22 by suitable means such as welding, the projecting portion 35 of the stabilizer 30 is held between this ring 36 and the stepped portion 26b and is freely rotatable within the opening 27. The lower case 23 is formed in its central portion with a disc receiving opening 37, in its rear end portion with engaging grooves 38, 38, in its front end portion with engaging portions 39, 39 and on one side thereof with a rack gear 40. A shutter plate 24 is formed with an opening 41 and a slot 42 which is continuous to the opening 41 and a lever 43 is mounted on the shutter plate 24. The plate 25 is formed in its central portion with a turntable insertion opening 44, in its front end portion with a laser beam slot 45. A ring 46 made of an elastic material is fixed to the peripheral portion of the turntable insertion opening 44.

The upper case 22 is attached to the lower case 23 by having the bosses 28, 28 engaged in the engaging grooves 38, 38. The shutter plate 24 is disposed under the lower surface of the lower case 23 and, by fixing the plate 25 to the lower surface of the lower case 23, the shutter plate 24 is held between the plate 25 and the lower case 23.

In the above described construction, the upper case 22 is pivotable about the bosses 28, 28 and thereby is capable of opening and closing the disc receiving opening 37 in which the disc 21 is received. When the upper case 22 is closed, the engaging projections 29, 29 engage in the engaging portions 39, 39 thereby preventing the upper case 22 from being unintentionally opened. By automatically operating the tip portion of the lever 43 projecting outwardly of the side of the lower case 23, the shutter plate 24 can be rotated in the direction of arrows $P_1$, $P_2$ about a pin 47 of the lever 43 supported by the lower case 23 whereby the laser beam slot 45 can be opened or closed depending upon whether the slot 42 is in register with the laser beam slot 45 or not.

Figure 7:
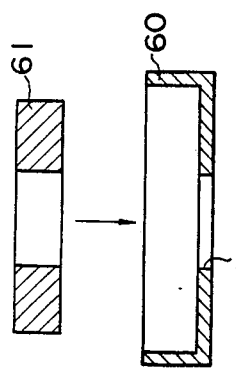
Figure 8:
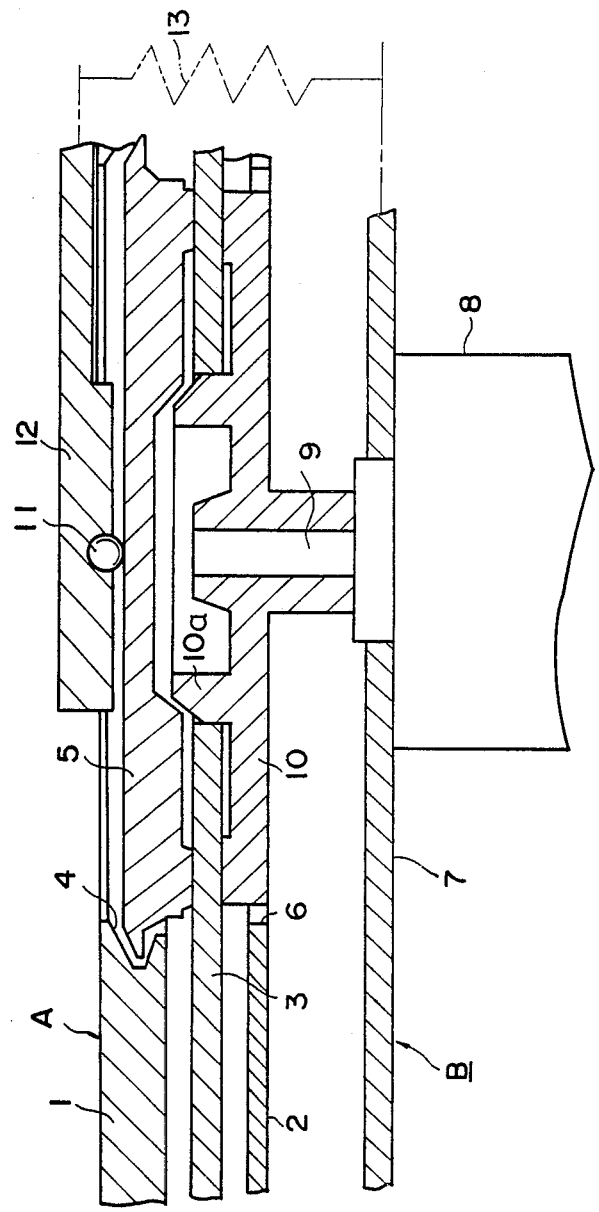
FIG. 8 is a vertical section showing a main part of a prior art disc cartridge player.

Referring now to FIGS. 1 and 5 through 7, the construction of the disc playback device D will be described. In these figures, reference character 50 designates a chassis. A disc drive motor 51 is mounted on the lower surface of the central portion of the chassis 50. A turntable 53 is fixed to a shaft 52 of the motor 51 projecting above the chassis 50. The turntable 53 comprises a main body 54 and a magnet assembly 55 fixed to the upper surface of the main body 54. The magnet assembly 55 constitutes a part of the magnetic attraction generating means. The main body 54 is a disc-like member made of synthetic resin and is formed in its central portion with a mounting wall portion 57 having a mounting opening 56 for mounting the turntable on the shift 52. The main body 54 is also formed on its upper surface with a disc supporting wall portion 58 surrounding the mounting wall portion 57 and on its upper peripheral portion with a disc holding portion 59. The magnet assembly 55 is composed, as shown in FIG. 7, of an annular magnet 61 bonded to the inner bottom surface of a cylindrical yoke 60 having a bottom and being made of a magnetic substance of high-permeability. The yoke 60 is formed in its bottom portion with an opening 62. The magnet assembly 55 is received in an annular groove 63 defined between the mounting wall portion 57 and the disc supporting wall portion 58 and has the outer surface of the yoke 60 bonded to the main body 54.

A holder 64 and a clamper 65 are supported on the upper side of the chassis 50 and a pickup head 66 is supported on the lower side of the chassis 50. The holder 64 is provided for holding the disc cartridge C when the disc cartridge C has been inserted in the disc playback device D. The holder 64 is constructed in such a manner that it is moved vertically by unillustrated drive means while holding the disc cartridge C therein. A loading pinion 67 is mounted on one side portion of the holder 64. The loading pinion 67 is rotated by unillustrated drive means to mesh with the rack gear 40 of the disc cartridge C loaded in the holder 64 and thereby displace the disc cartridge C in the directions of arrows $P_3$, $P_4$.

The clamper 65 has its pins 68, 68 engaged in holding members 69, 69 fixed to the holder 64 and is pivotable about the pins 68, 68 in the directions of arrows $P_5$, $P_6$. The clamper 65 is always urged by a spring 70 in the direction of the arrow $P_5$ and normally is in a position shown in FIG. 6 with an engaging portion 71 formed in the rear end portion thereof being in abutting engagement with a stop 72 fixed to the chassis 50. A steel ball 73 is mounted on the lower surface of the front end portion of the clamper 65.

The pickup head 66 is arranged in such a manner that it is moved in the directions of arrows $P_3$, $P_4$ beneath the disc 21 unillustrated drive means when the disc cartridge C is placed in a position in which the disc 21 is playable.

The holder 64, loading pinion 67, pickup head 66 and turntable 53 are associated with one another so that they are driven and stopped in a predetermined sequence.

In a case where the disc 21 is set in the disc cartridge C and this disc 21 is played back by the disc playback device D, handling of the disc cartridge C and operation of the disc playback device D are made in the following manner.

Figure 3:
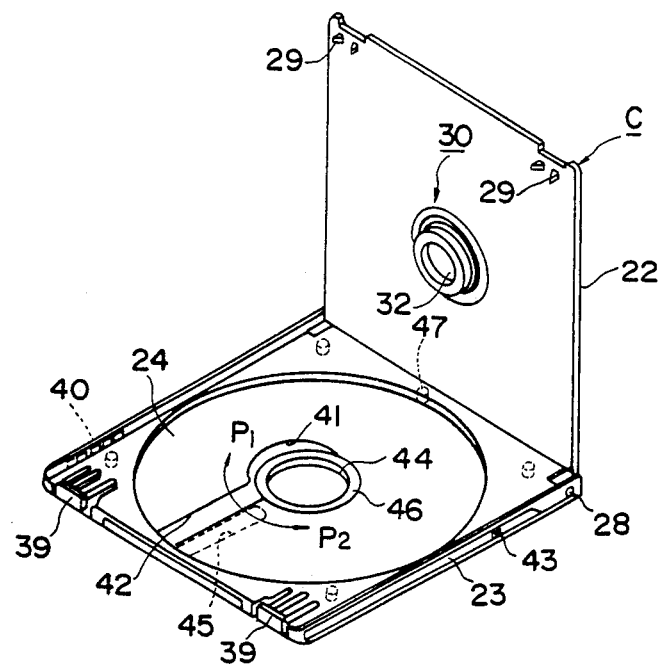
Figure 4:
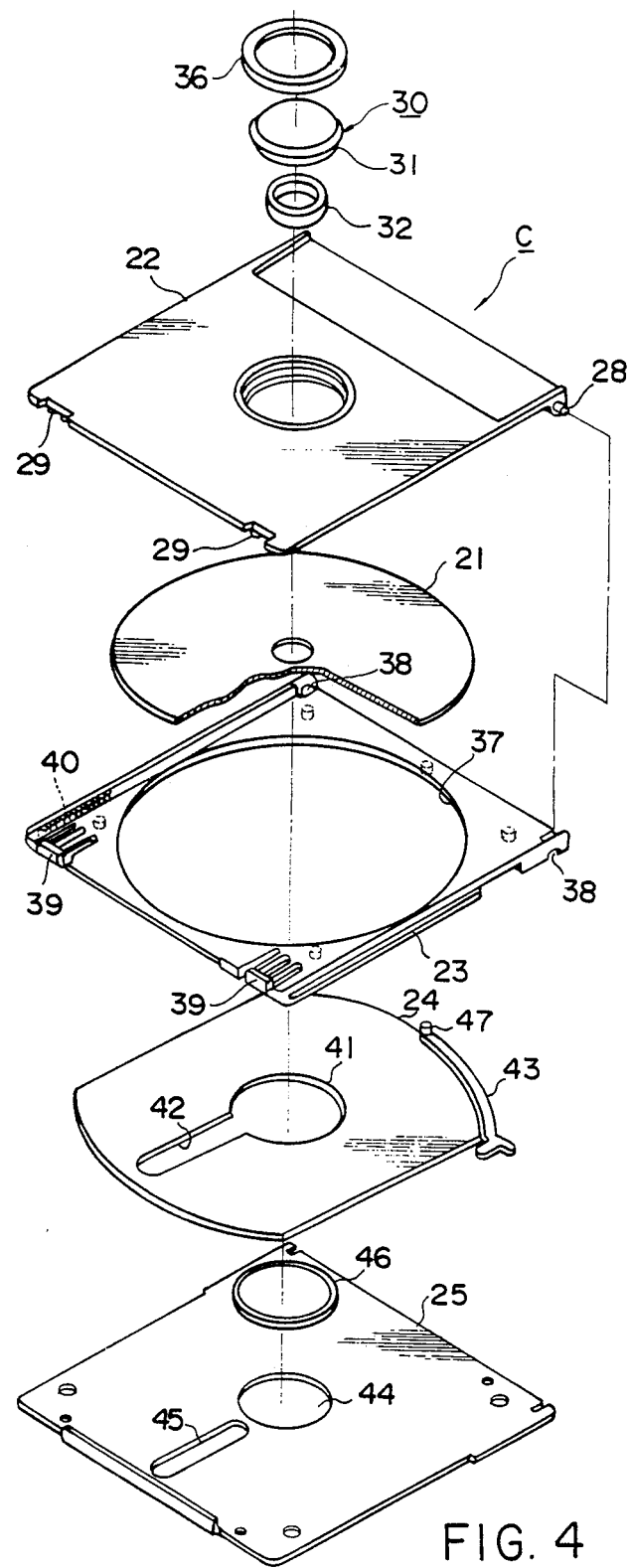
Figure 5:
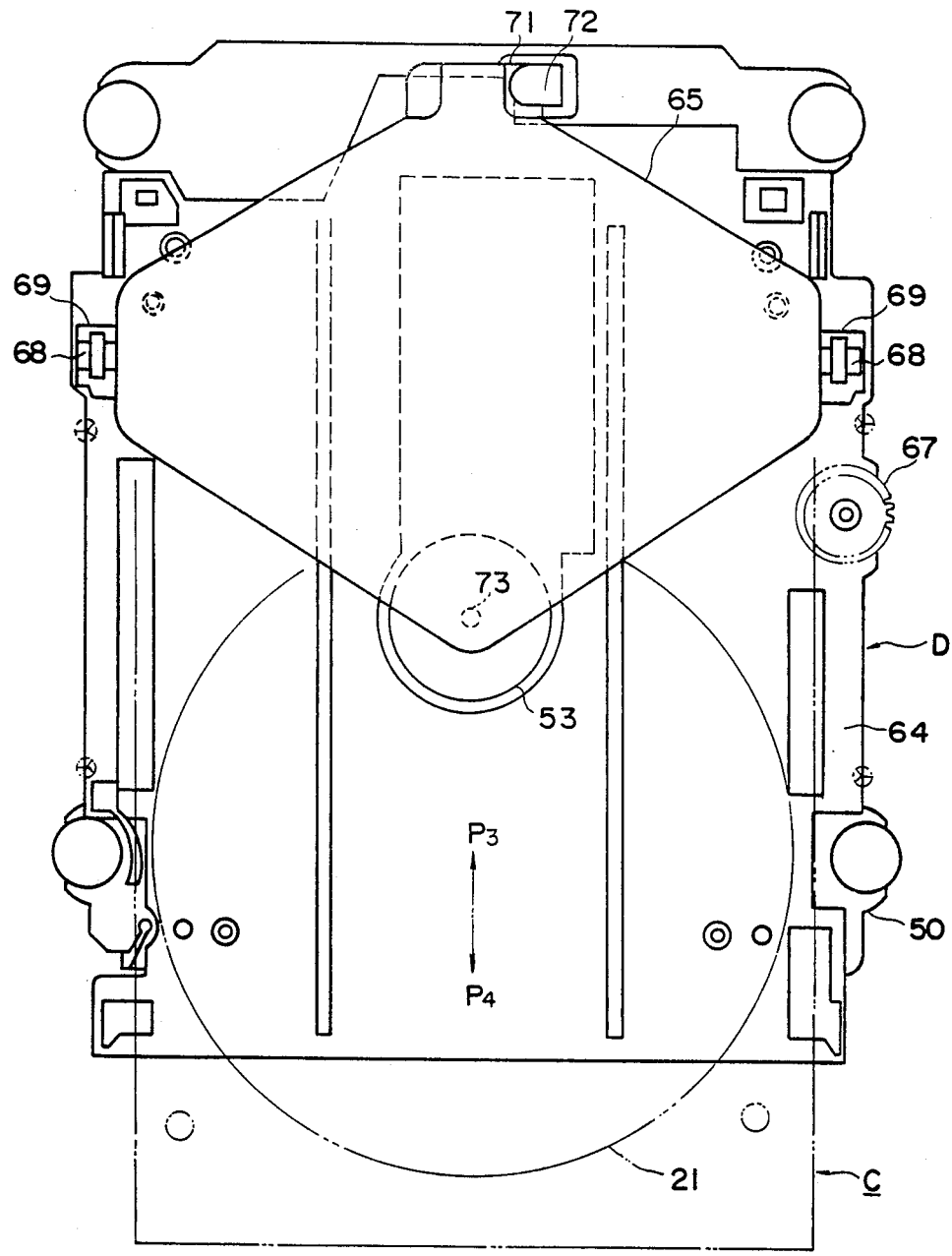
Figure 6:
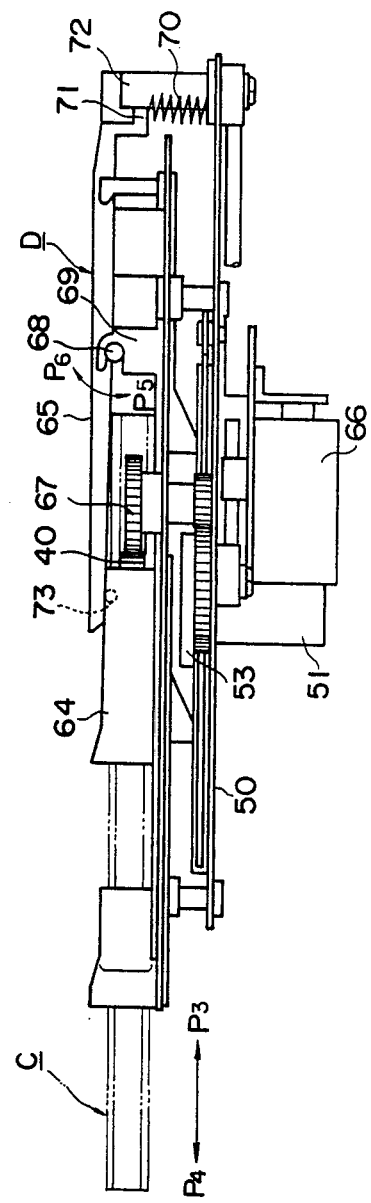

In setting the disc 21 in the disc cartridge C, the upper case 22 is opened from the lower case 23 as shown in FIG. 3, the disc 21 is placed in the disc receiving opening 37 of the lower case 23 and thereafter the upper case 22 is closed and the engaging projections 29, 29 are engaged in the engaging portions 39, 39. The laser beam slot 45 is closed at this time by operation of the lever 43.

When the disc cartridge C is to be inserted into the disc playback device D, the holder 64 of the disc playback device D is initially in a position elevated by a predetermined distance from the chassis 50. As the disc cartridge C is inserted into the holder 64 of the device D, the disc cartridge C is displaced in the direction of the arrow $P_3$ and its rack gear 40 comes into meshing engagement with the loading pinion 67. Then the loading pinion 67 is driven and the disc cartridge C is automatically displaced thereafter in the direction of the arrow $P_3$ by the rotation of the loading pinion 67. As the turntable insertion opening 44 of the disc cartridge C approaches a position above the turntable 53, the holder 64 starts its downward movement. When the center of the turntable insertion opening 44 of the disc cartridge C has come into register with the center of the turntable 53, the movement of the disc cartridge C is stopped while the holder 64 reaches its lowermost position and comes to a standstill in the lowermost position. At this time, the turntable 53 enters the disc cartridge C through the turntable insertion opening 44 with the disc supporting wall portion 58 entering the central opening of the disc 21. As the holder 64 moves downwardly, the clamper 65 is pivoted in the direction of the arrow $P_5$ about the pins 68, 68 and the steel ball 73 abuts against the central portion of the disc stabilizer 30 and pushes the disc stabilizer 30 downwardly. As the disc stabilizer 30 approaches the turntable 53, the magnetic substance ring 32 of the disc stabilizer 30 is attracted to the magnet 61 and the yoke 60 provided on the side of the turntable 53. The magnetic substance ring 32, magnet 61 and yoke 60 now form a magnetic circuit in which flux flows from the magnet 61 to the magnetic substance ring 32 and then to the yoke 60 and further to the magnet 61 and, accordingly, the magnetic substance ring 32 is attracted strongly to the magnet 61 and yoke 60. The disc 21 is supported by the disc supporting wall portion 58 of the turntable 53 and also is strongly held between the disc holding portion 59 of the turntable 53 and the disc holding portion 34 of the disc stabilizer 30. In this state, the disc 21, disc stabilizer 30 and turntable 53 can be rotated integrally. At this time, the laser beam slot 45 of the disc cartridge C is opened by an automatic operation of the lever 43. Then, by rotating the disc drive motor 51, the turntable 53 is rotated and the disc 21 held between the turntable 53 and the disc stabilizer 30 is also rotated. Upon giving a play command to the player, the pickup head 66 is displaced beneath the disc 21 in the direction of the arrow $P_3$ to read data recorded on the disc 21 through the laser beam slot 45 of the disc cartridge C and the disc 21 is thereby played back.

For taking out the disc cartridge C after the playback of the disc 21 has been finished, an eject command is given to the player. The disc cartridge C thereby is lifted and displaced in the direction of the arrow $P_4$ in the reverse order and is returned to an ejected position in which it can be taken out.

For securing the disc 21 on the turntable 53, the above described player employs a construction in which the magnet 61 and the yoke 60 attract the magnetic substance ring 32 while the disc stabilizer 30 is pushed downwardly by the clamper 65 to press the disc stabilizer 30 and the disc 21 against the turntable 53. Accordingly, accurate holding of the disc 21 is ensured and, in addition, the force of the spring 70 urging the clamper 65 can be set at a relatively small value so that the driving force of the drive means required for elevating the clamper in the eject mode can be conveniently reduced.

In the above described embodiment, the magnet 61 is provided on the surface of the turntable 53 and the magnetic substance ring 32 is provided on the surface of the disc stabilizer 30. Conversely, magnetic substance may be provided on the surface of the turntable 53 and a magnet may be provided on the surface of the disc stabilizer 30. Alternatively, magnets may be provided in both the turntable 53 and the disc stabilizer 30. In the case where the magnetic substance ring 32 is provided on the surface of the disc stabilizer 30 as in the above described embodiment, the disc cartridge C can be manufactured at a reduced cost.

In the above described embodiment, the magnetic substance ring 32 and the magnet assembly 55 are respectively bonded to the main body 31 of the disc stabilizer 30 and the main body 54 of the turntable 53. Alternatively, the entire disc stabilizer 30 may be made of a magnetic substance and the entire turntable 53 may be made of a magnet. Further, the yoke used in the above described embodiment may be omitted.

In the above described embodiment, the disc 21 is held partly by causing the clamper 65 to act on the disc stabilizer 30. If, however, the attraction between the magnet and the magnetic substance is sufficient for holding the disc 21 such, for example, as a stationary type disc cartridge player which is not subject to an adverse factor such as vibration, the clamper 65 may be omitted if desired.

What is claimed is:

1. A disc clamping device for a disc cartridge player of a type in which a disc cartridge housing a disc rotably therein is loaded in a disc playback device and the disc is held between a disc stabilizer provided rotatably in said disc cartridge and a turntable provided in said disc playback device during playback of the disc, said disc clamping device including magnetic attraction generating means provided in said disc stabilizer and said turntable for magnetically attracting the stabilizer to the turntable to hold the disc between said disc stabilizer and said turntable.

2. A disc clamping device as defined in claim 1 wherein said magnetic attraction generating means is constructed by forming at least a part of said disc stabilizer from a magnetic substance and forming at least a part of said turntable from a magnet.

3. A disc clamping device as defined in claim 2 wherein a yoke is attached to said magnet.

4. A disc clamping device as defined in claim 3 wherein said disc clamping device includes clamper means for exercising a clamping force upon said disc stabilizer and thereby pressing the disc upon said turntable.

5. A disc clamping device as defined in claim 1 wherein said magnetic attraction generating means is constructed by forming at least a part of said disc stabilizer from a magnet and forming at least a part of said turntable from a magnetic substance.

6. A disc clamping device as defined in claim 5 wherein a yoke is attached to said magnet.

7. A disc clamping device as defined in claim 6 wherein said disc clamping device includes clamper means for exercising a clamping force upon said disc stabilizer and thereby pressing the disc upon said turntable.

8. A disc clamping device as defined in claim 1 wherein said magnetic attraction generating means is constructed by forming at least a part of said disc stabilizer and at least a part of said turntable from a magnet.

9. A disc clamping device as defined in claim 8 wherein a yoke is attached to said magnet.

10. A disc clamping device as defined in claim 9 wherein said disc clamping device includes clamper means for exercising a clamping force upon said disc stabilizer and thereby pressing the disc upon said turntable.

11. A disc cartridge of a type which is capable of rotatably housing a disc therein and of being loaded in a disc playback device in such a manner that the disc housed therein can be rotated, said disc cartridge including a substantially planar, square-shaped top portion and a bottom portion pivotably connected to each other at one edge and a rotatable disc stabilizer for holding the disc between the stabilizer and a turntable provided in said disc playback device, at least a part of said stabilizer being formed of magnetic substance and at least a part of said turntable being formed of a magnet such that the stabilizer is magnetically urged toward the turntable.

12. A disc cartridge as defined in claim 11 wherein the top portion and the magnetic substance or the magnet of said disc stabilizer are integrally formed.

13. A disc clamping device for a disc player of the type in which a disc cartridge that houses a disc is loaded into a disc playback device and in which the disc is held between a rotatable disc stabilizer located in the disc cartridge and a turntable of the disc playback device, said disc clamping device having clamper means for applying physical pressure against the disc stabilizer to thereby press the disc against the turntable, the disc stabilizer having an annular magnetic substance located concentrically about the axis of rotation of the stabilizer, and the turntable having a magnet means for magnetically attracting the magnetic substance of the disc stabilizer and thereby urging the stabilizer against the surface of the disc and toward the turntable.

14. A disc cartridge for rotatably housing a disc and which is loaded into a disc playback device for playback of the disc on a turntable in the playback device, said disc cartridge comprising:
 a substantially planar, square-shaped top portion and bottom portion that are pivotably connected to each other along a first edge and that are provided with closure means along a second edge opposite the first edge for releasably holding the top portion against the bottom portion; and
 a disc stabilizer rotatably carried in the top portion, wherein at least a portion of the stabilizer is formed from a magnetic substance and at least a portion of the turntable is formed from a magnet, such that the disc is operatively held in the disc playback device by magnetic attraction between the disc stabilizer and the turntable of the disc playback device.

15. A disc cartridge for rotatably housing a disc said disc cartridge for use in a disc playback device having a turntable containing a magnet, said disc cartridge comprising:
 a substantially planar, square-shaped top portion and bottom portion that are connected to each other along a first edge and that are provided with closure means along a second edge opposite the first edge for releasably holding the top portion against the bottom portion the top portion including a cavity formed in a central area thereof which opens toward the bottom portion, the top portion being substantially rigid from the central area to its edges; and
 a disc stabilizer rotatably carried in the cavity, wherein at least a portion of the stabilizer is formed of a magnetic substance, such that the disc is clamped to the turntable by magnetic attraction between the disc stabilizer and the turntable.

* * * * *